US008467541B2

(12) United States Patent  (10) Patent No.: US 8,467,541 B2
Stuczynski  (45) Date of Patent: Jun. 18, 2013

(54) UNIVERSAL AUXILIARY COMPONENT CONNECTING SYSTEM FOR A PERSONAL AUDIO-SET

(75) Inventor: Ryan P. Stuczynski, Pully (CH)

(73) Assignee: Logitech Europe S.A., Morges (CH)

( * ) Notice: Subject to any disclaimer, the term of this patent is extended or adjusted under 35 U.S.C. 154(b) by 1048 days.

(21) Appl. No.: 11/993,830

(22) PCT Filed: Dec. 28, 2006

(86) PCT No.: PCT/US2006/049482
§ 371 (c)(1),
(2), (4) Date: Dec. 21, 2007

(87) PCT Pub. No.: WO2007/081568
PCT Pub. Date: Jul. 19, 2007

(65) Prior Publication Data
US 2010/0158297 A1  Jun. 24, 2010

Related U.S. Application Data

(60) Provisional application No. 60/756,597, filed on Jan. 4, 2006.

(51) Int. Cl.
*H04R 1/02* (2006.01)
*H04R 9/06* (2006.01)
(52) U.S. Cl.
USPC ........ 381/87; 381/332; 381/334; 361/679.41; 361/679.56

(58) Field of Classification Search
USPC ........ 381/332, 87, 334; 439/529; 361/679.41, 361/679.56
See application file for complete search history.

(56) References Cited

U.S. PATENT DOCUMENTS 6,648,695 B1  11/2003  Wu
2005/0060467 A1  3/2005  Wieck
2005/0265569 A1  12/2005  Langberg et al.

FOREIGN PATENT DOCUMENTS

EP  1 280 043 A2  1/2003

OTHER PUBLICATIONS

International Search Report of Feb. 20, 2008 in related PCT application No. PCT/US06/49482.
Written Opinion of Feb. 20, 2008 in related PCT application No. PCT/US06/49482.

*Primary Examiner* — Ramon Barrera
(74) *Attorney, Agent, or Firm* — Kilpatrick Townsend & Stockton LLP

(57) ABSTRACT

A universal auxiliary component connection system that operably connects an auxiliary component to a variety of different personal audio-sets using the connection cables supplied with each personal audio-set. In one embodiment, a clip operably connects the personal audio-set engaging fitting of the connection cable, and the clip is detachably secured to the auxiliary component. Accordingly, this connection system allows a variety of different personal audio-sets to be operably connected to the same auxiliary component without requiring the auxiliary component to offer a variety of different fixed connectors.

19 Claims, 5 Drawing Sheets

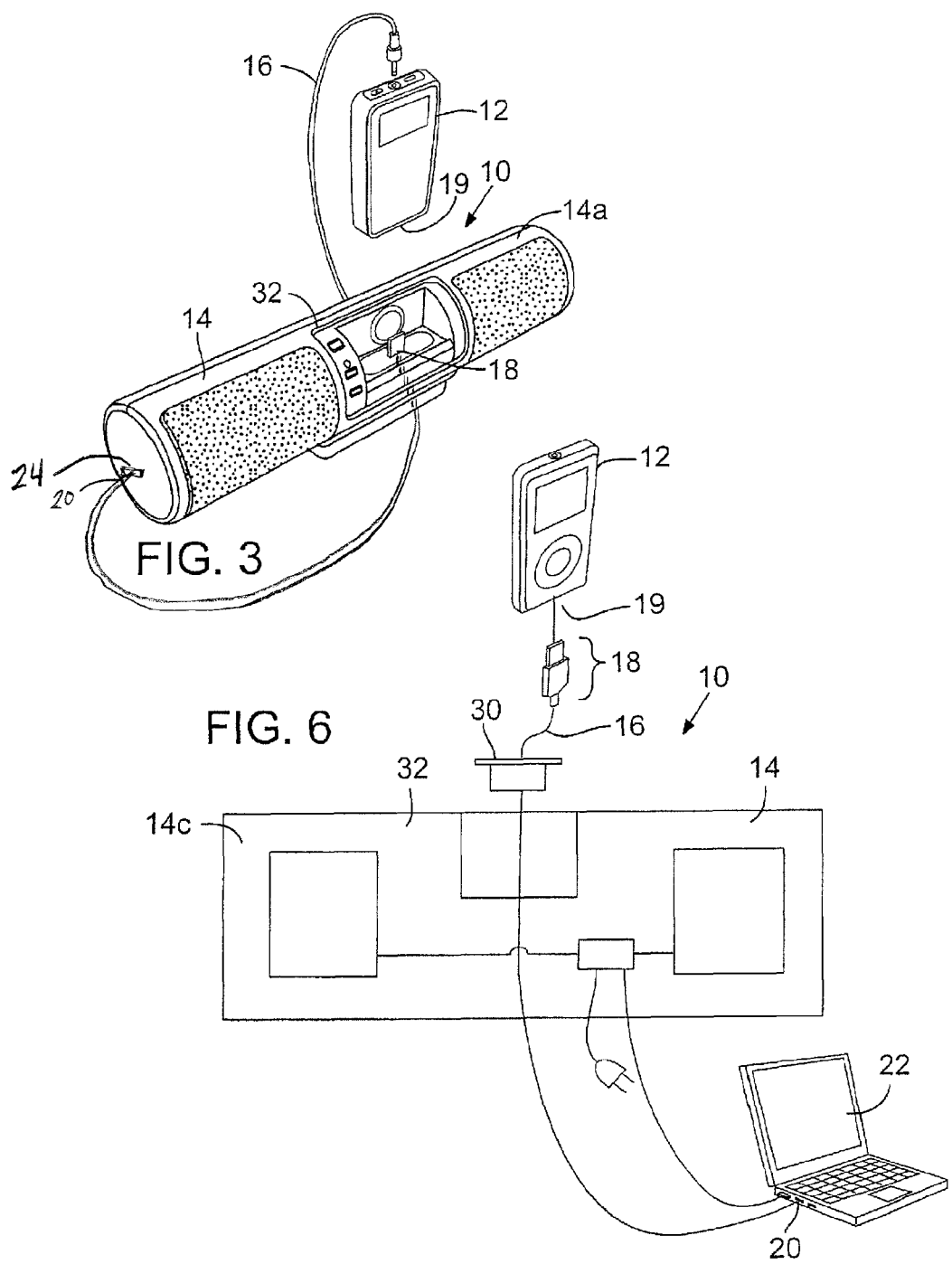

UNIVERSAL AUXILIARY COMPONENT CONNECTING SYSTEM FOR A PERSONAL AUDIO-SET

CROSS-REFERENCE TO RELATED APPLICATION

This application claims priority to U.S. provisional patent application Ser. No. 60/756,597, filed on Jan. 4, 2006.

FIELD OF THE INVENTION

The present invention relates to a universal connecting system for use in connecting an auxiliary personal audio-set component, such as a loud speaker system, docking station, or the like, to a personal audio-set, such as a portable MP3 player, cellular phone, or the like.

BACKGROUND OF THE INVENTION

Personal audio-sets, such as personal audio players, cellular phones and the like are well known. As the popularity of personal audio-sets increases, the need for auxiliary components for use with these personal audio-sets has also increased.

For example, the typical personal audio player conventionally plays audio content from any of a variety of formats including radio broadcasts, cassette tapes, compact discs (CDs) and the like. More recently, digital personal audio players have been developed that play audio content that is stored in a digital medium such as a memory circuit (e.g., flash memory) or a disk drive. These types of personal audio-sets are commonly known as MP3 payers. Examples of such MP3 Players include the iPod® players available from Apple Computer Company, including the original iPod®, the iPod® mini, and the iPod® nano.

Auxiliary components for use with personal audio-sets include docking stations, loudspeaker systems, and the like. Usually, each personal audio-set includes a fitting or jack for operably engaging such auxiliary components. The shape and functionality of these fittings and jacks tend to differ between manufacturers, and even between models for the same type of device offered by same manufacturer. Moreover, some personal audio-set manufacturers consider the shape of their connectors proprietary, thereby limiting the ability of third party manufacturers to produce auxiliary devices that can operably engage that manufacturer's personal audio-sets.

In general, the variability in the size and functionality of personal audio-set connectors has allowed auxiliary devices to connect to the personal audio-sets of only one particular manufacturer, and in some cases to only one model of that manufacturer. For example, auxiliary loudspeaker systems for use with MP3 players are gaining in popularity. The auxiliary loudspeaker usually includes the mating fitting for only one particular MP3 player, and a user connects, or "docks," that MP3 player to the loudspeaker system, thereby allowing the digital music in that MP3 player to broadcast over the auxiliary loudspeaker system.

The mating connector for use with the auxiliary loudspeaker system is rigidly secured to the auxiliary loudspeaker system. Accordingly, if an owner of a particular auxiliary loudspeaker system wish to use a different MP3 player that has a different sized or shaped engaging connector, their existing auxiliary loudspeaker system will not connect to this different MP3 player.

Similarly, in order to ensure proper functionality of auxiliary component devices with a wide variety of MP3 players, after market manufacturers of such auxiliary components must make a variety of different models of the same loudspeaker system, with each model having a different sized and shaped mating connector attached.

SUMMARY OF THE INVENTION

Accordingly, despite the available improvements offered by auxiliary personal audio-sets and their related auxiliary components, there remains a need for an economical universal connection system that allows a variety of different personal audio-sets to be operably connected to the same auxiliary component without requiring the auxiliary component to offer a variety of different fixed connectors. In addition to other benefits that will become apparent in the following disclosure, the present invention fulfills these needs.

The present invention is a universal auxiliary component connection system that operably connects an auxiliary component to a variety of different personal audio-sets using the computer connection cables supplied with each personal audio-set. In a preferred embodiment, a clip operably connects the personal audio-set engaging fitting of the connection cable, and the clip is detachably secured to the auxiliary component. Accordingly, the personal audio-set manufacturer's supplied connection cable functions as a "dock" for connecting the personal audio-set to the auxiliary component.

BRIEF DESCRIPTION OF THE DRAWINGS

FIG. 3 is an isometric view of an MP3 player operably secured to an auxiliary loudspeaker system in accordance with an embodiment of the present invention.

FIG. 6 is a schematic diagram of an alternative embodiment of the present invention.

DETAILED DESCRIPTION OF PREFERRED EMBODIMENTS

Figures 1A, 1B:
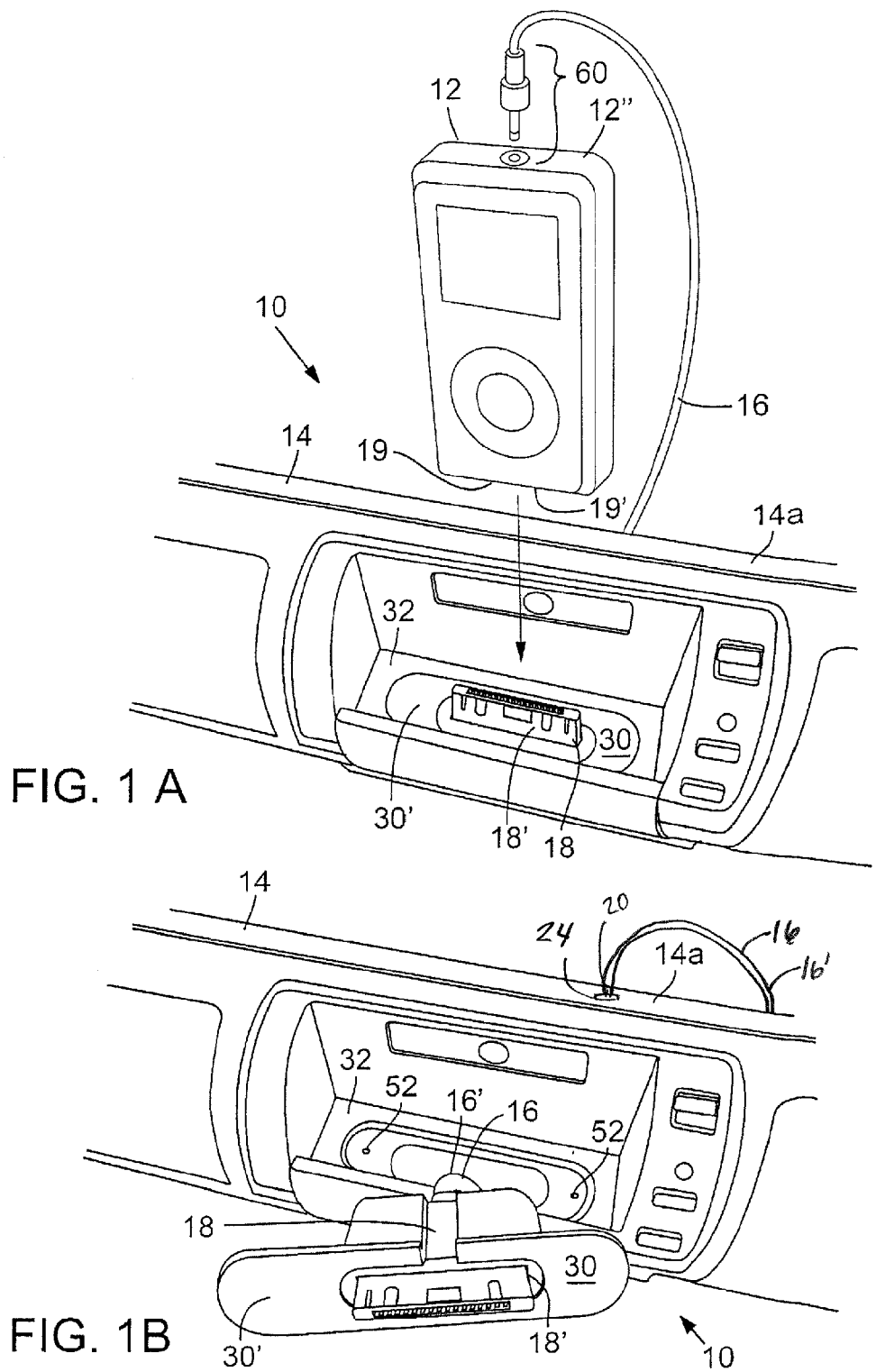
FIG. 1A is an isometric view of a first personal audio-set operably engaging an auxiliary component using the connection cables provided with the personal audio-set. One connection cable is operably received within a first detachable clip, and the first detachable clip is secured within the auxiliary component.
FIG. 1B is an isometric view of the auxiliary component of FIG. 1A showing one end of the connection cable provided with the personal audio-set operably secured within the first detachable clip, with the first detachable clip detached from the auxiliary component to show possible orientation of these components.

A universal auxiliary component connection system 10 for connecting a personal audio-set 12, such as an MP3 player, cellular telephone, or the like, to an auxiliary component 14, such as a loudspeaker system, docking station, or the like using the connection cable 16 provided with the personal audio-set 12 is shown in FIGS. 1A-8.

The personal audio-set 12 is often purchased separately from the auxiliary component 14, and usually includes a connection cable 16 for connecting the personal audio-set 12 to a computer 22 and the like. The connection cable 16 includes a mating fitting 18 on one end for operably engaging a connector 19 on the personal audio-set 12. The opposite end of the connection cable 16 includes a jack 20, which is usually a conventional USB jack, for engaging a computer 22 or the like. Different personal audio-sets 12' (FIGS. 1A), 12" (FIGS. 2A) tend to have different sized and shaped connectors 19' (FIGS. 1A & 1B), 19" (FIGS. 2B & 2b). Accordingly, the connection cable 16' (FIGS. 1A & 1B), 16" (FIGS. 2A & 2B) provided with each personal audio-set necessarily have different shaped mating fittings 18' (FIGS. 1A & 1B), 18" (FIGS. 2A & 2B).

Figures 2A, 2B:
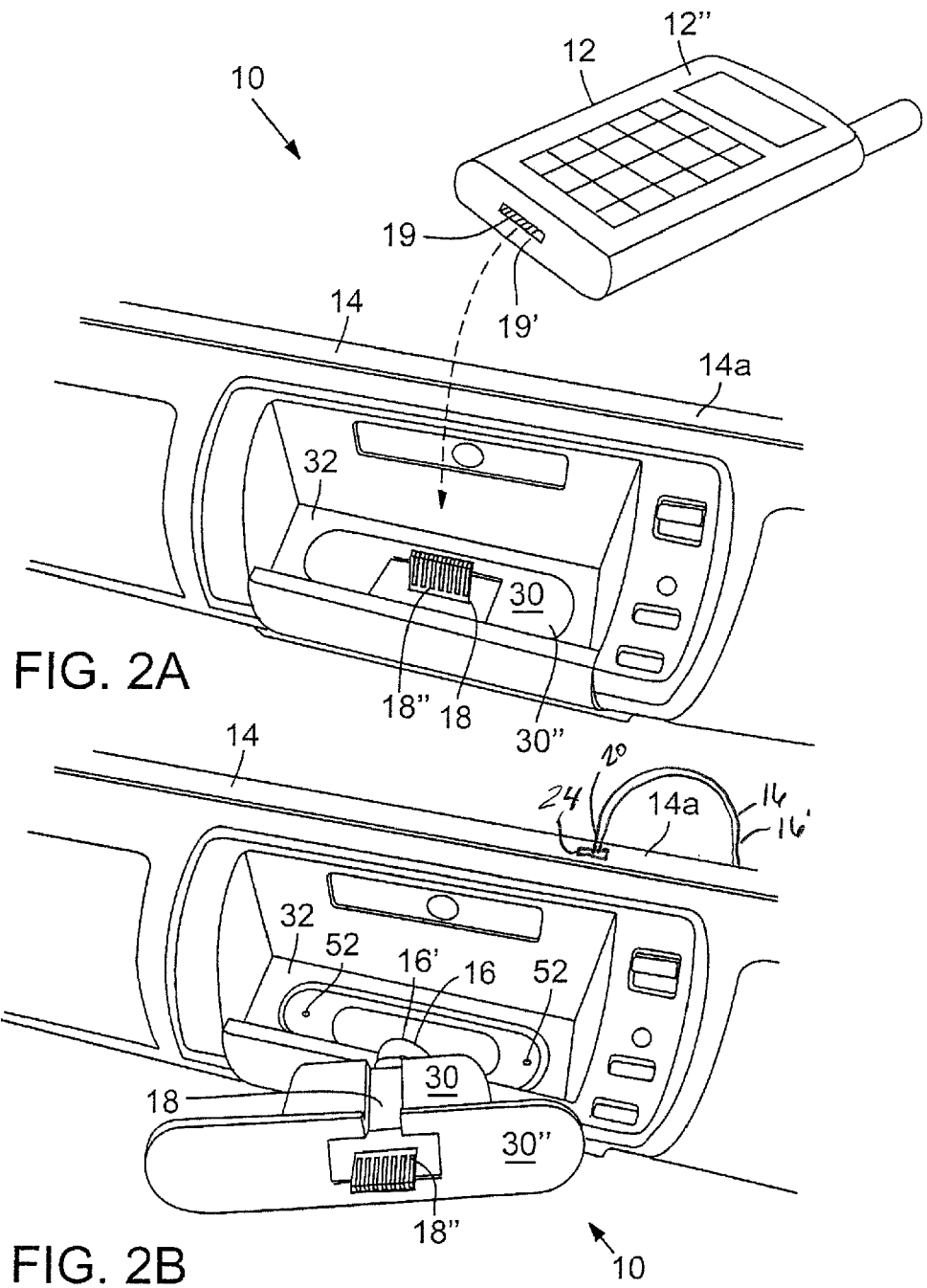
FIG. 2A is an isometric view of a second personal audio-set operably engaging the auxiliary component of FIG. 1A using a second connection cable provided with the second personal audio-set. The second connection cable is operably received within a second detachable clip, and the second detachable clip is secured within the auxiliary component.
FIG. 2B is an isometric view of the auxiliary component of FIG. 2A showing one end of the second connection cable provided with the second personal audio-set operably secured within the second detachable clip, with the second detachable clip detached from the auxiliary component to show possible orientation of these components.

As best shown in FIGS. 1B & 2B, the mating fitting 18', 18" on the connection cable 16', 16" is detachably secured within a detachable clip 30 (30' FIGS. 1A & 1B), 30" (FIGS. 2A & 2B)) that is sized to operably engage its respective mating fitting as shown. The detachable clip 30 is then detachably secured within a frame 32, thereby substantially rigidly holding the mating clip 30 so as to allow the personal audio-set 12 to "dock" to the frame 32 as shown in FIGS. 1A and 2B.

Figure 8:
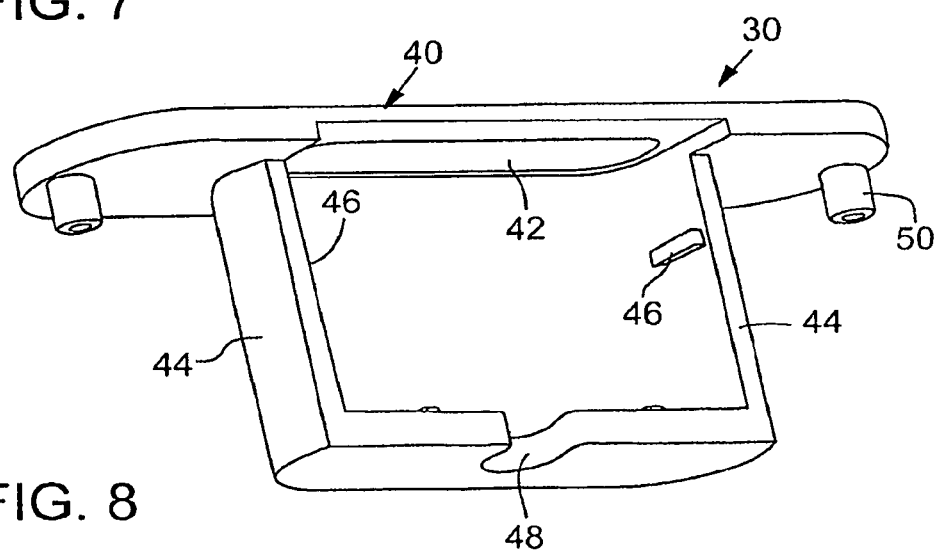
FIG. 8 is an enlarged isometric view of an alternative detachable clip in accordance with an embodiment of the present invention.

Referring to FIG. 8, the detachable clip 30 is preferably integrally molded to define a substantially planar top surface 40 with an opening 42 sized to receive the mating fitting 18 therethrough. Retaining walls 44 are sized to snuggly hold the mating fitting 18. If needed, protrusions 46 on the retaining walls 44 can align with release mechanisms on the mating fitting 18, thereby allowing the mating fitting 18 to be easily detached from the personal audio-set 12 without requiring detachment of the detachable clip 30 from the frame 32. A recess 48 is preferably provided to allow the connection cable 12 to extend therethrough. Pins 50 extend from the detachable clip 30 for operably engaging mating recesses 52 (FIGS. 1B & 2B) on the frame 32.

Figure 7:
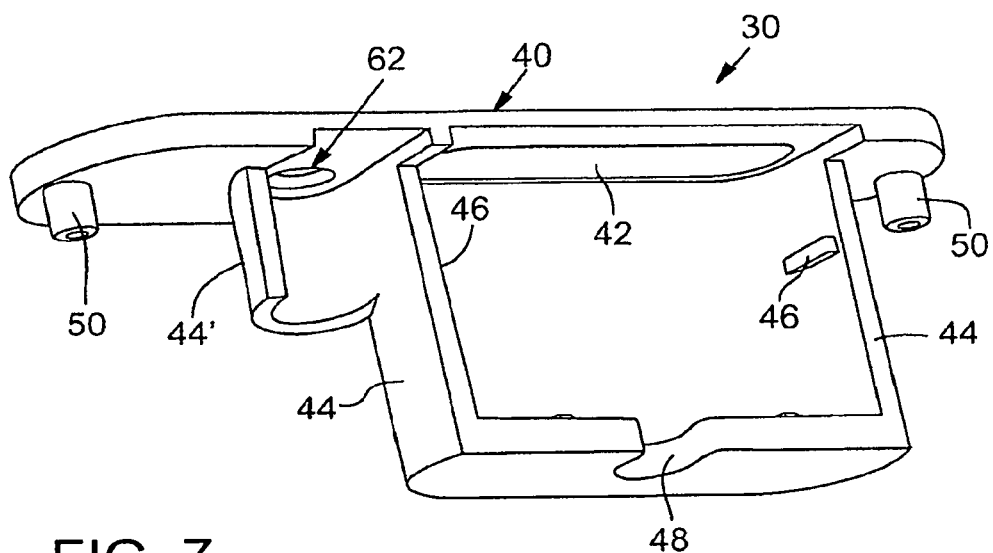
FIG. 7 is an enlarged isometric view of the detachable clip of FIG. 1.

In cases where an audio jack 60 (FIGS. 1A & 3) is also required for a particular personal audio-set 12, a second opening 62 in the substantially planar top surface 40 and related retaining walls 44' can be provided as shown in FIG. 7.

It can be appreciated that the retaining walls 44, 44' and openings 42, 62 in the detachable clip 30 can be modified as needed to accommodate a particular sized and shaped mating fitting 18. However, the overall dimensions of the detachable clip 30 remain common, thereby allowing it to be detachably received within the frame 32. Accordingly, a variety of personal audio-sets 12' (FIG. 1A), 12" (FIG. 2A) can be operably secured to the same frame 32 simply by selecting the detachable clip 30' (FIG. 1B), 30" (FIG. 2B) needed to engage the particular mating fitting 18' (FIG. 1A), 18" (FIG. 1B) for the desired personal audio-set. Preferably, the manufacturer of the auxiliary component 14 includes a plurality of detachable clips 30, each sized to accommodate a different mating fitting 18. Alternatively, a purchaser of the auxiliary component 14 can select the needed detachable clip 30 at the time of purchase and/or order it from the auxiliary component manufacturer as needed.

The frame 32 forms the auxiliary component 14, which can be a portable loudspeaker system 14a (FIGS. 1A-3), a docking station 14b (FIGS. 4 & 5), a structure that serves both of these functions 14c (FIG. 6), or the like. Referring to FIGS. 1A-3, in cases, where the auxiliary component 14 is a portable loudspeaker system 14a, the opposite end 20 of the connection cable 16 is operably secured to the loudspeaker system 14a, which includes a mating connector 24 and related circuitry such as a power supply, drivers, user interface, and related integrated logic and memory to allow the loudspeaker system 14a to operably engage the personal audio-set 12 using conventional methods and equipment.

Figure 4:
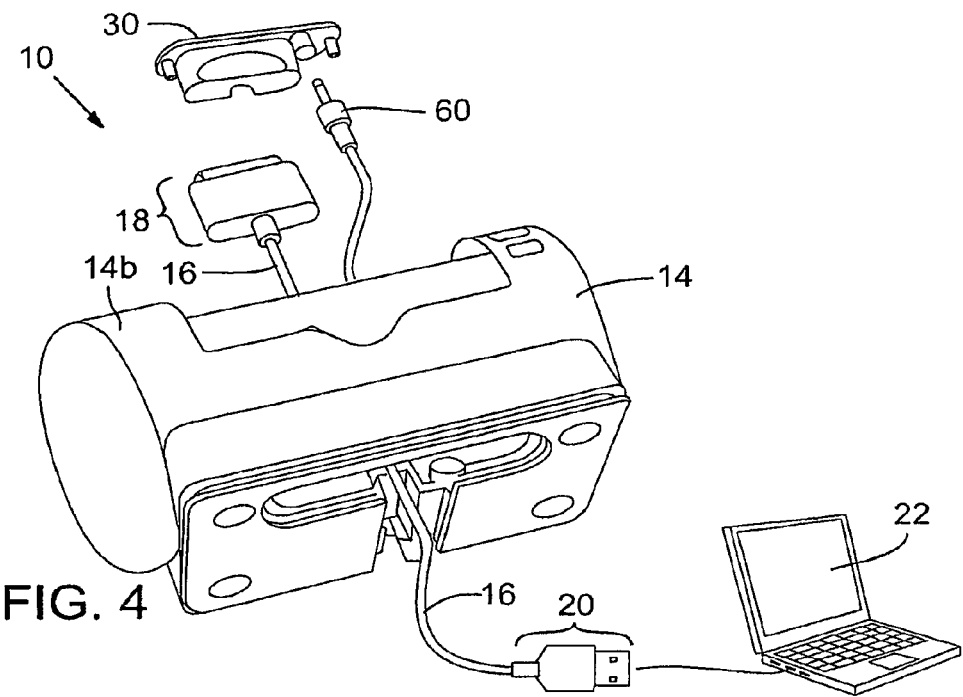
FIG. 4 is an exploded view of a personal audio-set connection cable provided with the personal audio-set operably secured to a detachable clip that is detachably secured to a base, thereby defining a docking station for the personal audio-set, with the opposite end of the connection cable being operably secured to a computer.
Figure 5:
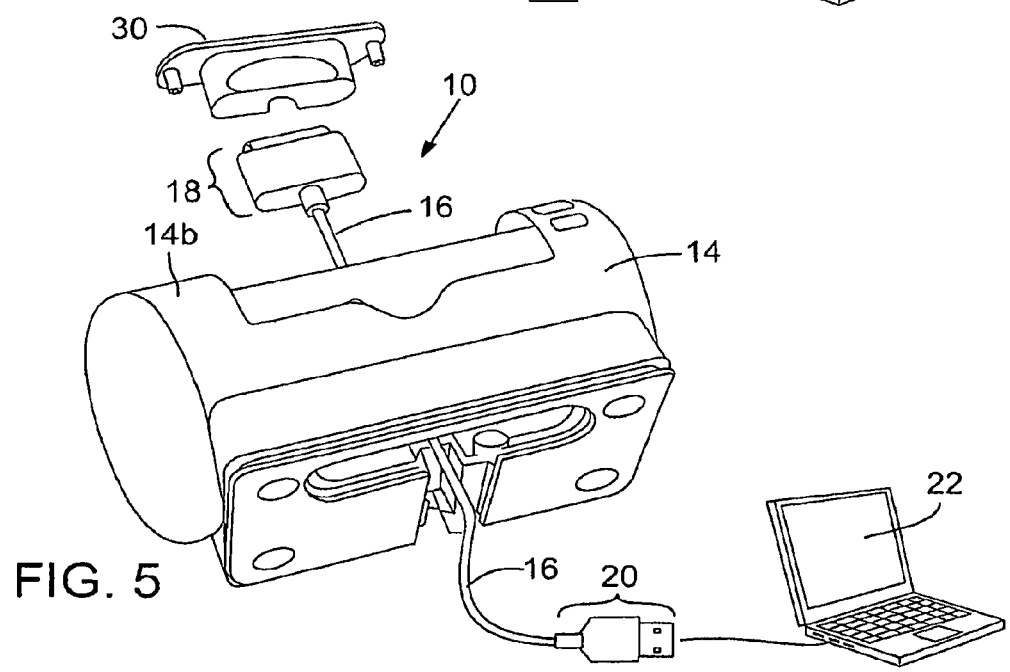
FIG. 5 is the base of FIG. 4 operably engaging a different personal audio-set connection cable with a different clip in accordance with an embodiment of the present invention.

Referring to FIGS. 4 & 5, in cases where the frame 32 defines a docking station 14b, the opposite end of the connection cable 16 is operably secured to a computer 22 or the like using conventional methods and equipment.

Referring to FIG. 6, in cases where the frame 32 serves as both a docking station and a loudspeaker system 14c, the opposite end of the connection cable 16 is preferably operably secured to a computer 22 or the like, and the computer 22 is connected, either wirelessly 60 or via a wired connection 62 to the speaker system as shown using conventional methods and equipment.

Simply by providing consumers with the particular detachable clip 30 needed for holding the mating fitting 18 of a particular personal audio-set 12, a manufacturer of auxiliary components 14 for use with personal audio-sets 12 need only manufacturer one auxiliary component 14 model for use with a variety of different personal audio sets 12' (FIG. 1A), 12" (FIG. 2A). Similarly, should a purchaser of such an auxiliary component 14 change the particular model and/or manufacturer of their personal audio-set 12, the purchaser can make their auxiliary component 12 continue to operate with their new personal audio-set 12 simply by changing the detachable clip 30.

Having described and illustrated the principles of our invention with reference to a preferred embodiment thereof, it will be apparent that the invention can be modified in arrangement and detail without departing from such principles. In view of the many possible embodiments to which the principles may be put, it should be recognized that the detailed embodiment is illustrative only and should not be taken as limiting the scope of our invention. Accordingly, we claim as our invention all such modifications as may come within the scope and spirit of the following claims and equivalents thereto.

I claim:

1. A universal auxiliary component connection system for connecting a personal audio-set to an auxiliary component through a connection cable, the connection cable having a mating fitting toward one end for operably engaging the personal audio-set and a jack toward an opposite end for operably engaging the auxiliary component, the component connection system comprising:
   a frame housing the auxiliary component; and
   a clip detachably secured to said mating fitting of the connection cable, said clip detachably secured to said frame so that said mating fitting is operably positioned to connect to said personal audio-set when said personal audio-set is positioned on said frame.

2. The universal auxiliary component connection system of claim 1, wherein a second personal audio-set is connectable to said auxiliary component, said second personal audio-set having a second connection cable with a second mating fitting toward one end for operably engaging the second personal audio-set and a jack toward an opposite second end for operably engaging the auxiliary component, said component connection system comprising:

a second clip detachably secured to said second mating fitting of the second connection cable, said second clip detachably secured to said frame so that said second mating fitting is operably positioned to connect to said second personal audio-set when said second personal audio-set is positioned on said frame.

3. The universal auxiliary component connection system of claim 2, wherein said frame has a predefined mount for receiving said clip and said second clip therein.

4. The universal auxiliary component connection system of claim 2, wherein said mating fitting and said second mating fitting have different exterior shapes.

5. The universal auxiliary component connection system of claim 2, wherein said personal audio-set is an MP3 player produced by a first manufacturer, and said second personal audio-set is an MP3 player produced by a second manufacturer.

6. The universal auxiliary component connection system of claim 1, wherein said personal audio-set is an MP3 player.

7. The universal auxiliary component connection system of claim 1, wherein said auxiliary component is an auxiliary loudspeaker system.

8. The universal component connection system of claim 1, further including a plurality of said clips, each clip of said plurality of clip sized to receive a different shaped mating fitting therein while still being detachably securable, one at a time, to said frame.

9. The universal component connection system of claim 1 further comprising:

a mating connector operably secured to the frame for operably engaging the jack of the connection cable.

10. The universal auxiliary component connection system of claim 1 wherein the clip comprises an opening sized to receive the matting fitting therethrough.

11. The universal auxiliary component connection system of claim 1 comprising an opening sized to receive an audio jack.

12. A universal auxiliary component connection system for connecting a personal audio-set to an auxiliary component through a connection cable, the connection cable having a mating fitting toward one end for operably engaging the personal audio-set and a jack toward an opposite end for operably engaging the auxiliary component, the component connection system comprising:

a frame housing the auxiliary component;

a mating connector operably secured to the frame for operably engaging the jack of the connection cable;

a clip detachably secured to the mating fitting of the connection cable, the clip detachably secured to the frame so that the mating fitting is operably positioned to connect to the personal audio-set when the personal audio-set is positioned on the frame with the jack of the connection cable operably engaging the mating connector of the auxiliary component.

13. The universal auxiliary component connection system of claim 12, wherein a second personal audio-set is connectable to the auxiliary component, the second personal audio-set having a second connection cable with a second mating fitting toward one end for operably engaging the second personal audio-set and a jack toward an opposite second end for operably engaging the auxiliary component, the component connection system comprising:

a second clip detachably secured to the second mating fitting of the second connection cable, the second clip detachably secured to the frame so that said second mating fitting is operably positioned to connect to the second personal audio-set when the second personal audio-set is positioned on the frame with the jack of the second connection cable operably engaging the mating connector mount of the auxiliary component.

14. The universal auxiliary component connection system of claim 13, wherein the frame has a predefined mount for receiving the clip and the second clip therein.

15. The universal auxiliary component connection system of claim 13, wherein the mating fitting and the second matting mating fitting have different exterior shapes.

16. The universal auxiliary component connection system of claim 13, wherein the personal audio-set is an MP3 player produced by a first manufacturer, and the second personal audio-set is an MP3 player produced by a second manufacturer.

17. The universal auxiliary component connection system of claim 12, wherein the personal audio-set is an MP3 player.

18. The universal auxiliary component connection system of claim 12, wherein the auxiliary component is an auxiliary loudspeaker system.

19. The universal auxiliary component connection system of claim 12, further including a plurality of clips, each clip of the plurality of clips sized to receive a different shaped mating fitting therein while still being detachably securable, one at a time, to said frame.

* * * * *